May 30, 1967  F. B. REED  3,322,409
WATER CONTROL APPARATUS FOR CROSSFLOW COOLING TOWER
Filed Sept. 8, 1964  3 Sheets-Sheet 1

INVENTOR.
Forrest B. Reed
BY
Hovey, Schmidt, Johnson & Hovey
ATTORNEYS

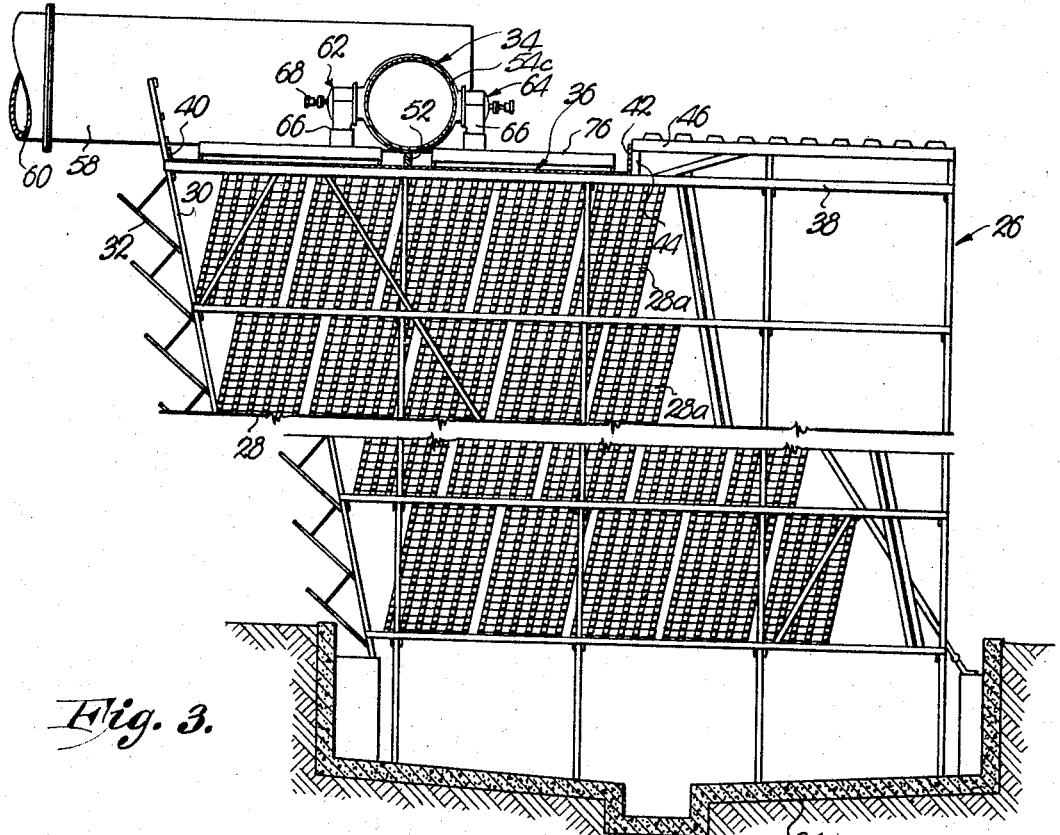
Fig. 3.
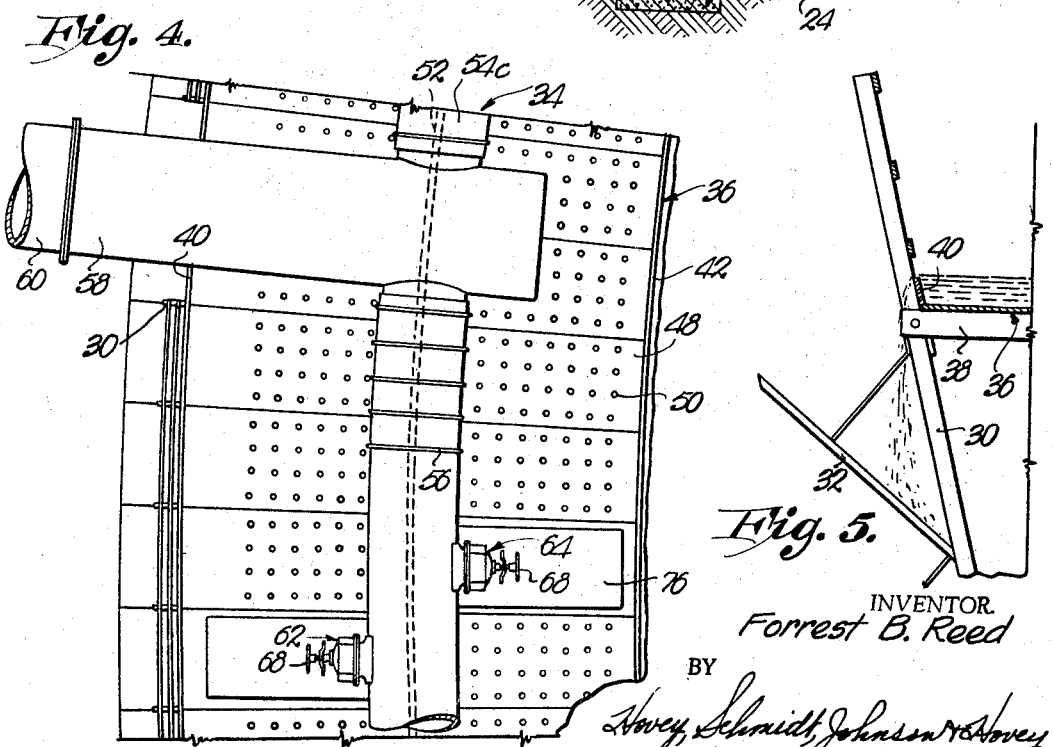
Fig. 4.
Fig. 5.
INVENTOR.
Forrest B. Reed
BY
Hovey, Schmidt, Johnson & Hovey
ATTORNEYS May 30, 1967 F. B. REED 3,322,409
WATER CONTROL APPARATUS FOR CROSSFLOW COOLING TOWER
Filed Sept. 8, 1964 3 Sheets-Sheet 3

INVENTOR.
Forrest B. Reed
BY
Hony, Schmidt, Johnson & Hovey
ATTORNEYS

United States Patent Office 3,322,409
Patented May 30, 1967

3,322,409
WATER CONTROL APPARATUS FOR CROSSFLOW COOLING TOWER
Forrest B. Reed, Kansas City, Mo., assignor to The Marley Company, Kansas City, Mo., a corporation of Delaware
Filed Sept. 8, 1964, Ser. No. 394,917
5 Claims. (Cl. 261—71)

This invention relates broadly to apparatus for cooling large quantities of water and especially to novel hot water control and distribution equipment for use on natural draft cooling towers having crossflow fill assemblies therein. Unique and relatively inexpensive structure is used to control distribution of hot water onto the fill assemblies of the tower to not only preclude icing of the inlet louvers and the air inlet face of the fill assemblies during operation of the equipment under extremely low temperature conditions, but also permit selective control of the water loading of the fill assemblies under varying ambient temperatures to assure optimum tower performance.

Industrial crossflow cooling towers conventionally include a casing defining an air inlet and an air outlet on opposite sides of a fill assembly located within the casing, and provided with a hot water distribution basin overlying the fill assembly, and a cold water collection basin disposed to receive the cool water as it gravitates from the fill assembly. Various means are employed to effect flow of air through the tower casing for most efficient cooling of the water as the same moves downwardly through the fill assembly. Fans are often employed, either in the air inlet of the tower casing or more frequently, at the air discharge end thereof, with operation of the fans being selectively controllable as required to lower the temperature of the water to a specified level. Cooling towers employing motor driven fans are not only desirable from the standpoint of the compact design of units of this type, but also because they can be operated under varying ambient temperature conditions. In hot weather, the fans can be operated continuously. In somewhat cooler weather, the fans can be selectively controlled to operate only when need to maintain the necessary air flow through the tower. Under extremely cold conditions, when there would be a tendency for the inlet face of the fill assembly and the inlet louvers to ice over, the fans can be reversed to cause hot air to be directed outwardly through the air inlet of the tower for a time sufficient to effect melting of the ice.

It is of course, well known that the droplets of water, spray, fines and water vapor at the air inlet of a cooling tower, and which are produced by the water gravitating through the fill assembly, tend to freeze on the surfaces of the tower not directly exposed to the hot water when the tower is operated under ambient temperatures substantially below the freezing point of water. The problem is particularly acute in those geographical areas where the temperature drops to extremely low levels and remains at these levels for extended periods of time. Fan reversal however, has been satisfactory as a procedure for precluding icing of the areas which are exposed to the water spray, but not the direct flow of the hot water, so long as adequate surveillance and control is maintained over the fan operation.

Although the icing problem described above can normally be controlled in fan-operated cooling towers of the crossflow type, reverse operation of fan components to de-ice the inlet surfaces of the tower is not available for ice control in natural draft towers. Towers of the chimney type which rely on the natural draft effect in the vertical stack, have an advantage over towers utilizing fans to induce air flow through the fill assembly, because of the fact that operating costs are limited to pumping of the water and maintenance of the tower itself. The cost of the electrical power to drive fans is completely eliminated. However, natural draft towers have not heretofore been successfully used to any great extent in geographical areas where the temperatures may remain for many continuous hours substantially below the freezing point of water, because of the problems incident to icing of the inlet surfaces of the tower casing. It is to be recognized in this respect that the icing conditions mentioned, not only serve to decrease the air flow through the tower, thereby possibly resulting in inability of the tower to meet operating specifications under all ambient conditions likely to be encountered, but also resulting in very severe and expensive damage to the components of the tower by virtue of the weight of the ice thereon. In this respect, the problem is especially difficult because the more that ice tends to build up, the more difficult it is to remove or melt the same and the more damaging the ice becomes to the physical components of the tower. In fact, it has previously been necessary under certain circumstances where natural draft towers are used in cold climates, to completely shut the tower down during certain parts of the year to avoid build-up of ice on the outer surfaces of the structural members, inlet louvers and air inlet face components of the fill assembly within the tower casing. The problems of icing of the tower inherently limit the sales of natural draft crossflow towers in cold weather areas for many reasons. For example, attention and supervision from operators, required to prevent icing of the tower especially during nighttime hours, may greatly exceed acceptable cost levels. Furthermore, the air velocity induced through the fill assemblies by the high stack of a natural draft cooling tower also necessarily varies with temperature conditions, thus making it impossible to size the tower for all ambient temperatures to which the tower will be subjected. This has resulted in sizing of the towers to assure performance at near average maximum ambient air temperatures likely to be encountered.

U.S. Patent No. 3,117,170 disclosed a successful answer to the problem of icing of the outer inlet louvers and adjacent structural member of a crossflow cooling tower employing a fan to induce horizontal air flow through the fill assembly. In a tower of this type it has been found desirable to slope the outer fill assembly face in the direction of drift of the water during gravitation thereof through the fill assembly; thus assuring maximum utilization of the fill area. It is preferred that the slope of the outer fill face be so calibrated that under the normal operating air velocity through the fill, the water drawback as it falls from top to bottom is at an angle corresponding to the angle of inclination of the stack of inlet louvers. Moreover, as described in the above patent, the calibration between the slope of the stack of inlet louvers and the proximal face of the fill assembly is such that a uniform quantity of hot water is caused to cascade down the inner portions of the louvers, thereby keeping such louvers and the adjacent structural members free of ice even at extremely cold temperatures. Although an arrangement of this type is well adapted for use in an induced draft crossflow tower having one constant air rate provided by a fan, it does not offer a solution to icing in natural draft towers wherein the velocity of air through the fill is a highly variable function of environment, imposed hot water temperature and ambient air condition.

Maximum performance is required at maximum temperatures. At maximum temperatures, with design water loading and design heat, the buoyancy drive or chimney effect which induces the air flow through the fill is at its least. It is, therefore, at this velocity that the slope of the louver face must be selected. For example, assuming that the air draws the water back 1 foot for each 6 foot fill height of water travel, if a tower having seven stories of fill is used, it would be expected that the water would be drawn back 7 feet while it is falling 42 feet. If the total air travel or radial dimension of fill is 20 feet, it can be seen if there is no slope at all, approximately the outboard ⅓ of the fill at the bottom would be dry and about ⅓ of the water would have blown into the drift eliminators by the time it reached the bottom of the tower. This would not do. Thus, the slope of the louver face should be calibrated for the air rate which will be induced at design maximum temperatures, considering the system loss in static pressure head, water loading, heat in the water, etc.

The operating parameters are completely different under winter conditions. Thus, if the temperature falls to say, 10° F. but with the heat rate on the tower still being high, the heat potential on the tower and the buoyancy effect or chimney effect increase greatly. The water will be induced back radially toward the drift eliminators to an extent that the water no longer cascades down the louvers, but has been drawn back into the fill by the time it reaches the bottom. The bottom inlet louvers, the outboard splash bars of fill, the lower louver columns, and other adjacent structure is therefore, subjected directly to an ambient condition of 10° F. The splashlets of water working their way out from the fill impinge on these subfreezing surfaces. This is the environment under which damaging ice occurs.

It, therefore, is desirable that the water drawback be kept in calibration with the louver face slope. However, it is not feasible to have a variable slope louver, so it becomes necessary to create a variable slope to the water.

It is, therefore, the primary object of the present invention to provide improved water distribution means for directing hot water onto the fill assembly of a crossflow cooling tower wherein the quantities of water delivered to the inlet portion of the fill assembly may be varied as needed under varying air velocities therethrough to maintain drawback of water from the inlet face of the fill assembly in required calibration with the fill assembly inlet face and to preclude formation of ice on the surfaces of the fill assembly or components of the tower adjacent thereto during cold weather operation.

A still further important object of the invention is to provide water control apparatus for cooling towers especially adapted for use on natural draft towers, but also utilizable on towers having fans therein, to preclude the necessity of operating the fans in reverse under cold climatic conditions.

Also, an important object of the invention is to provide water distribution apparatus for crossflow cooling towers, and especially those of the natural draft type, wherein the water distribution basin overlying the fill assembly is divided into two sections with one of the same being located in closer relationship to the air inlet of the tower than the other section, and with hot water delivery conduit means being located above the distribution basin in disposition whereby the hot water to be cooled may be directed into the respective sections at varying rates so that greater quantities of hot water may be directed into the outer section to permit selective variation of the water loading on the outer portion of the fill assembly under changing air velocities and to especially preclude icing of the outer face of the fill assembly and associated components, during operation of the tower under cold climatic conditions.

Another important aim of the invention is to provide water distribution apparatus as described above which is particularly adapted for use in connection with a natural draft tower having fill assembly means located around the entire perimeter of the base of the tower stack, and wherein the water distribution basin located above the fill assembly means, and also circumscribing the stack, is divided into individual sectors so that hot water may be selectively delivered to respective radially located sectors as required to assure proper operation of the tower under different climatic conditions and preclude icing of the outer portion of the fill assembly.

A still further important aim of the invention is to provide water distribution apparatus of the general type specified above, which is adapted to be mounted on existing natural draft towers without substantial modification thereof, and which may be used on newly constructed natural draft towers, or ones presently in existence, without substantial increase in the operational maintenance thereof, or at great expense over the cost of the tower.

Other important objects of the present invention will be explained or become obvious as the following specification progresses.

In the drawings:

FIG. 3 is a greatly enlarged, vertical cross-sectional view of the portion of the tower illustrated in cross section in FIG. 1, and better showing the novel hot water distribution means of the present invention overlying the conventional fill assembly means of the tower;

FIG. 4 is a fragmentary plan view of the portion of the tower shown in FIG. 3;

FIG. 5 is a greatly enlarged, vertical cross-sectional view of the upper left-hand portion of the tower structure as shown in FIG. 3; FIG. 5 illustrates the way in which water may be permitted to overflow the distribution basin onto the inlet louvers located around the perimeter of the air inlet of the tower;

Figure 6:
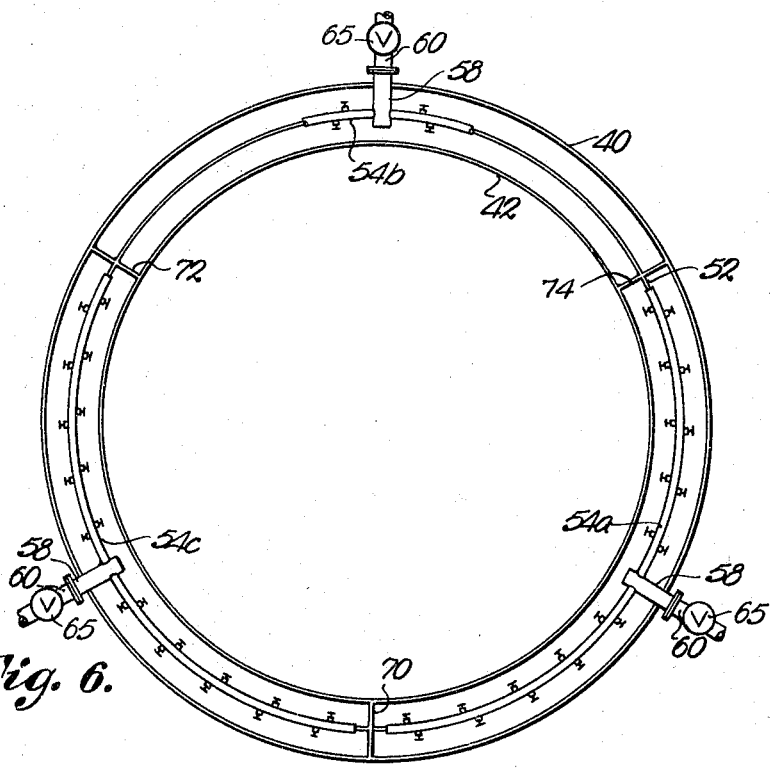
Figure 7:
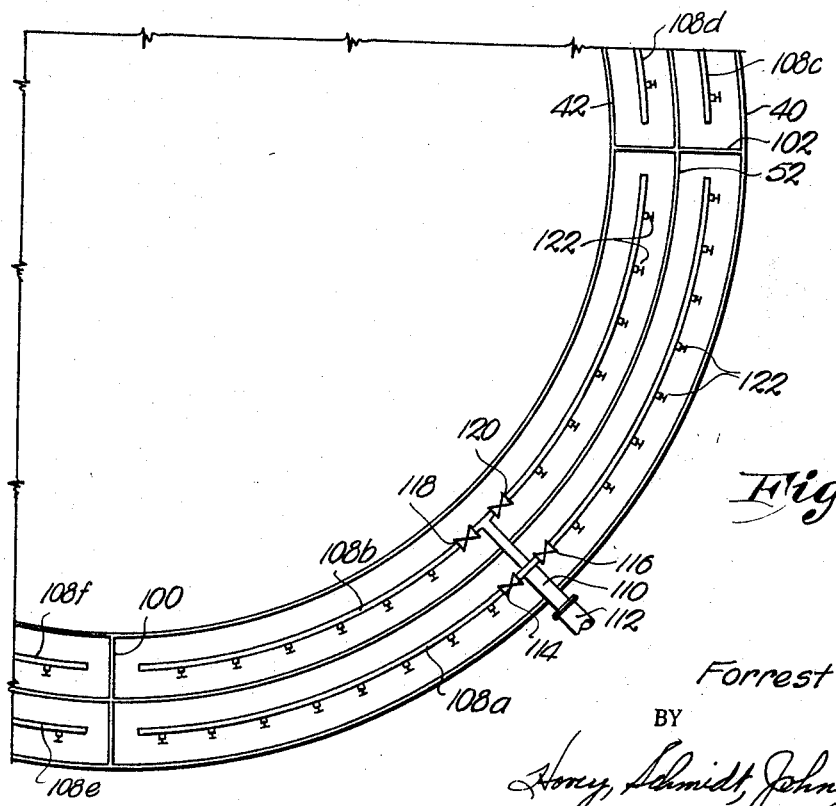

FIG. 6 is a schematic plan representation of the hot water distribution means of this invention indicating the way in which the hot water basin may be divided radially into three separate segments and with water supply pipes being provided to direct hot water into each segment; and FIG. 7 is an essentially schematic plan representation of a modified hot water distribution means constructed in accordance with the general concept of the present invention and illustrative of an arrangement wherein the basin is divided into quadrants with individual hot water distribution units for each quadrant, but with double piping and a more fully automated valving scheme being employed.

The natural draft water cooling tower illustrated in FIGS. 1–6 of the drawings is broadly designated by the numeral 10 and for purposes of the persent illustration, includes a circular shell foundation 12 located below ground level 14 for supporting a series of inclined shell support columns 16 which, in turn, carry the upright hyperbolic shell 18. The material from which shell 18 is constructed is not significant to the present invention, but because of the normally great size of these stacks, reinforced concrete is often employed. The shell thereby presents an air outlet 20 at the upper extremity thereof, while the lower circular margin 22 of shell 18 is maintained in spaced relationship from ground level 14 by support columns 16 to define an air inlet around the entire circumference of the shell.

An annular concrete cold water collection basis 24 is generally provided in surrounding relationship to shell 18, recessed in the ground and serving to support framework boadly designated 26 which carries a series of crossflow fill assemblies 28 which may be made up of a series of horizontally disposed wooden slats located in not only vertically spaced relationship, but also horizontally spaced so that the slats are vertically staggered. As previously explained, because of the tendency of the water gravitating through the fill assemblies 28 to draw back in the direction of air flow, it is conventional practice to step back the fill assembly sections as shown best in FIG. 3, wherein the individual fill assembly sections 28a are successively stepped back as the cold water collection basin 24 is approached. The slope of the outer face of the fill assemblies is preferably correlated with the degree of drawback of water from the face caused by incoming air at the velocity thereof when the tower is operating at expected maximum wet bulb ambient temperature.

The outer upright, vertically inclined support members 30 of framework 26 carry a series of relatively wide, elongated inlet louvers 32 which are also stepped back in generally parallel relationship to the face of adjacent fill assembly sections 28a, to present a staggered stack of inlet louvers which terminate in overlying relationship to the cold water basin 24. As is apparent in FIGS. 1 and 3, the lowermost margin of each inlet louver 32 is located above an area of the louver there next below intermediate the longitudinal edges of such louver, so that water gravitating from the lower margin of each louver, will fall onto an intermediate area of the louver located there next below.

The hot water distribution means broadly designated 34 in the drawings, comprises the preferred embodiment of the present invention, and is adapted to be mounted on the conventional natural draft tower components previously described. Distribution means 34 includes a horizontal, generally annular wooden deck or basin floor 36 supported by the horizontal members 38 of framework 26, and of sufficient width to substantially overlie the upper portions of the fill assemblies 28 as is apparent in FIG. 3. The deck 36 cooperates with an outer, circular, generally upright wall 40 resting on deck 36, as well as an inner, upright, generally circular wall 42, also resting on deck 36, to define a hot water receiving and distribution basin. The inner wall 42 is in part supported by frame members 44 and 46 of framework 26, while the outer wall 40 is secured to the upper extremities of support members 30.

The deck 36 is made up of a series of radially extending floor panels 48 which are each provided with a number of openings therein receiving removable water metering orifices 50 for gravitational delivery of hot water onto the upper portions of fill assemblies 28. The pattern of the distribution orifices 50 is best evident from FIG. 4.

A third upright, generally circular wall is provided on deck 36 and is designated in the drawings by the numeral 52. The dividing wall 52 is located substantially equidistantly from walls 40 and 42 in a direction radially of hot water distribution means 34, and divides the hot water basin into an outer section adjacent the upright outer face of fill assemblies 28, as well as a second inner section between wall 42 and the proximal upright face of wall 52. Thus, it is to be understood that the divider wall 52 extends around the full circumference of deck 36. Three radial walls 70, 72 and 74 (FIG. 6) between walls 40 and 42, divide each of the sections into individual distribution compartments.

Figure 1:
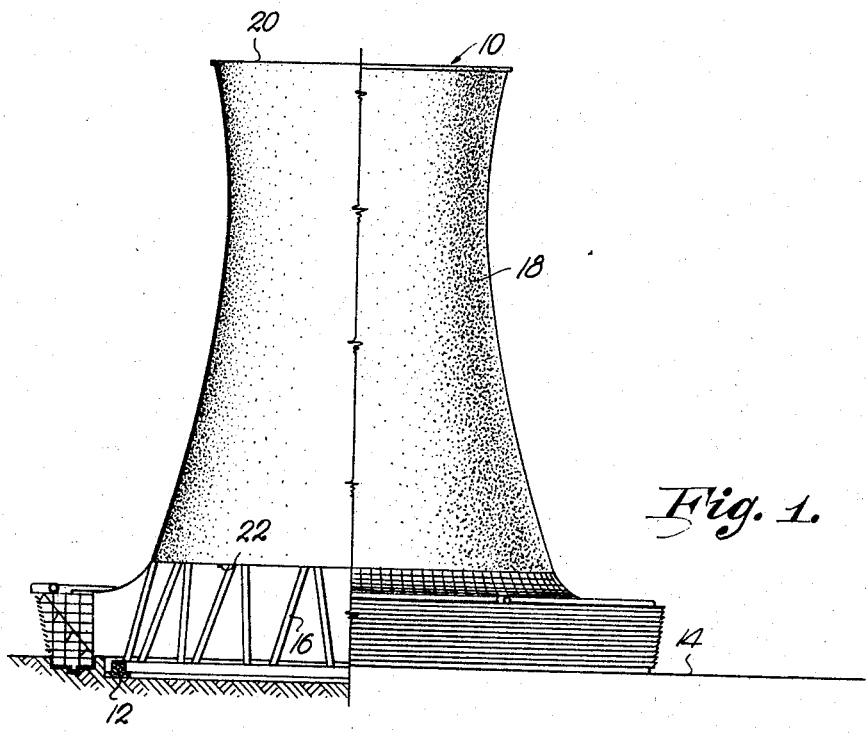
FIGURE 1 is an elevational view of a natural draft water cooling tower of the industrial type and embodying the preferred construction of the present invention, with the left half of the tower being broken away and in vertical cross section to reveal the internal construction of the tower.
Figure 2:
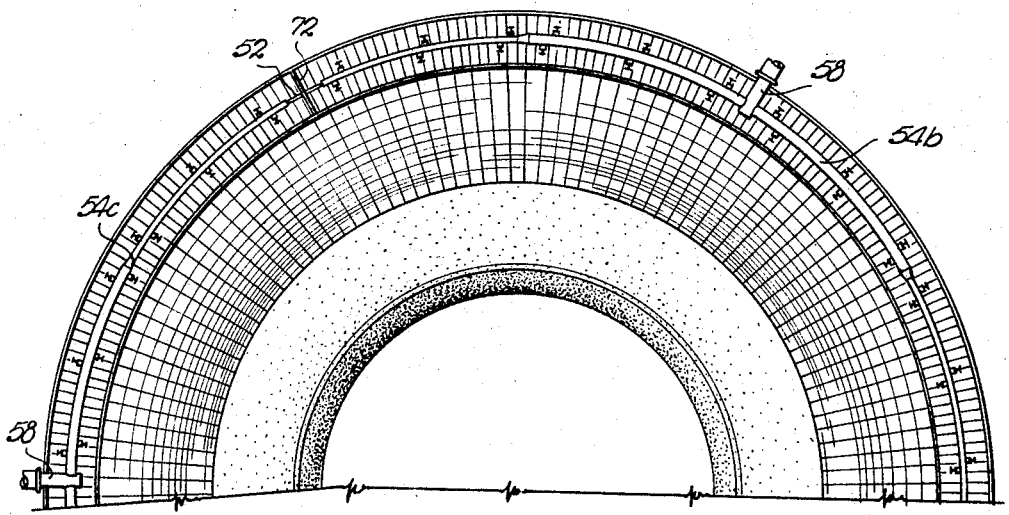
FIG. 2 is a fragmentary plan view on an enlarged scale of the tower illustrated in FIG. 1.

Structure for delivering hot water to the distribution means 34 includes three longitudinally arcuate, relatively large conduits 54a, 54b and 54c located directly above wall 52 in circumscribing relationship to the lower portion of shell 18, and normally supported above basin floor 36 by a series of transverse radial saddles (not shown) carried on the upper surface of deck floor 36. Thus, one of the conduits 54 is located between each adjacent pair of radial walls 70, 72 and 74 and terminate in spaced relationship therefrom as is shown in FIGS. 2 and 6. The conduits 54 are normally constructed of redwood staves held in proper position by circumscribing hoops 56. A pipe T 58 is coupled to each of the conduits 54a, 54b and 54c intermediate the ends thereof as shown in FIGS. 2, 3 and 4. Thus T's 58 are located on imaginary radii located approximately 120° apart. Hot water supply risers 60 are suitably coupled to the outer extremities of respective T's 58.

A series of water flow control valves 62 and 64 are coupled to each of the conduits 54a, 54b and 54c on opposite sides thereof as shown in FIGS. 3 and 4, with the outlet valves 62 extending over the outer section of the hot water basin between outer wall 40 and divider wall 52, while the outlet valves 64 project inwardly toward the center of the tower and thereby overlie the inner section of the distribution basin between divider wall 52 and inner wall 42. Valves 62 and 64 are located in alternate disposition longitudinally of respective conduits 54. Each of the valves has a downwardly opening housing 66 thereon terminating in slightly spaced relationship to the upper face of deck 36, as well as manually operable control handles 68 accessible to a workman as he walks along access walkways (not shown) extending around distribution means 34 on opposite sides of conduits 54. The outlet valves 62 and 64 are of the conventional high volume, low-pressure type and, therefore, have not been detailed, but it is to be understood that the quantity of water delivered from respective valves is dependent upon the setting of control handles 68.

Although not specifically illustrated in the drawings, it is to be understood that gates or weirs may be provided in divider wall 52, as well as walls 70, 72 and 74 to assure even distribution of hot water throughout the entire area of the hot water basin when the gates or weirs are open. These gates are then closed to permit segregation of the various basin sections or segments for cold weather operation, as will be explained.

If desired, a splash and diffusion box assembly 76 of conventional design may also be provided on deck 36 in association with each of the outlet valves 62 and 64 to dissipate directional water velocity and to preclude excessive splashing of the water discharged from respective valves.

In operation of tower 10, during summer months when the ambient temperature approaches the maximum wet bulb temperature that may be expected, the control handles 68 of valves 62 and 64 are all set to the full open position, and similarly, the valves 65 interposed in pipes 60 leading to T's 58 are also in a fully open condition to cause even distribution of water to the hot water basin at full flow rates and minimum head loss. Thus, water discharged from the housings 66 within splash box assemblies 76 is permitted to flow outwardly over the deck 36 for gravitation through orifices 50 onto the upper portions of adjacent fill assemblies 28. As the water gravitates downwardly through the fill assembly sections 28a, the water is broken up into droplets which fall vertically until they impinge on the slat there next below. This break-up of the water into droplets necessarily produces fines, relatively small water particles and droplets which go in all directions including outwardly against the air flow. The inlet louvers 32 serve to contain this splash and water fines, because of impingement of the droplets against the upwardly facing surfaces of the louvers 32 which are located in staggered relationship. The water collecting on the louvers 32 gravitates to the lower margin thereof, and then falls onto the louver below. The water thus travels successively down the louvers until it is finally discharged into the cold water collection basin 24. Furthermore, because of the angle of inclination of the outer face of fill assembly 28 and the inlet louvers 32, a part of the hot water from basin 36 cascades down the stack of louvers 32 thereby preventing icing of the tower inlet as explained in U.S. Patent No. 3,117,170. In view of the fact that tower 10 must provide specified performance even at the highest maximum ambient air temperature likely to be encountered, it is necessary to design the components thereof so that the slant of the outer face of the fill assembly and the inlet louvers are correlated to maintain the fill completely wetted under those conditions where the air velocity through the fill is at a minimum.

However, when referring to winter operation of the tower 10 in those areas having relatively cold weather with ambient temperatures well below the freezing point of water, it can be recognized that the chimney effect of the tower is greatly increased and, therefore, the velocity of air flowing through fill assembly 28 is increased substantially. Drawback of water in the direction of air flow is thereby greatly increased and resulting in a tendency for the outer inlet portion of the fill assembly to become dry and cessation of water cascade down louvers 32.

Notwithstanding greater drawback of hot water from the inlet of the fill assembly, there is still a certain proportion of droplets of water and fines which splash out of the fill assembly sections 28a toward louvers 32 and thereby impinge not only on the upwardly facing surfaces of the inlet louvers, but also on the structural members of framework 26, and the outer slats of fill assembly sections 28a. These surfaces are no longer directly within the path of gravitating hot water through the fill assembly section because of the tendency of the water to draw back in the direction of air flow. Since these droplets strike relatively cold surfaces which are not exposed to the hot water, they tend to immediately freeze and thereby coat all of the exposed surfaces of the tower with an icy film, and thence bulk ice. As the ambient temperature falls, the chimney effect of shell 18 increases. Thus, there is an even greater tendency for the water gravitating downwardly through the fill sections 28a to draw back toward the inner portion of the fill sections, and thereby leaving even greater surface areas of the framework, fill assembly sections and louvers 32 exposed to the icy blasts of the cold air inducted into the lower perimeter of tower 10.

In the absence of means to adequately control icing of the tower, it would either have to be shut down or other means such as fans installed to blow hot air outwardly to deice the tower. Manifestly, the fans would be expensive, the operation thereof would be costly, and if it is necessary to use fans, then there is less reason for justifying the expense of construction of a relatively large stack such as shell 18.

The present hot water distribution structure obviates the icing difficulties referred to above by providing means for varying the amount of hot water directed toward the outer portion of the fill assembly sections 28a to prevent drawback of hot water from the inlet portion of tower 10 to an extent that permits build-up of ice thereon under very low ambient temperature operation. Furthermore, the hot water distribution apparatus is constructed to permit overflowing of the distribution basin onto the louvers 32 if necessary, for flow of large quantities of hot water down the upwardly facing surfaces of louvers 32 to prevent formation of ice thereon. Finally, the hot water distribution means is constructed in a novel manner to permit direction of varying quantities of water to different segments of the tower around the perimeter thereof, to assure the availability of sufficient hot water at all times to effectively deice the tower regardless of the temperatures in which the tower must operate.

When the ambient temperature reaches a level below the freezing point of the water, it is only necessary for tower maintenance personnel to mount the tower and adjust the control handle of valves 62 and 64, to cause a greater quantity of water to flow into the divided outer basin section between wall 40 and wall 52, with respect to the quantity of water permitted to flow into the inner section between wall 42 and divider wall 52. In this connection, it is to be understood that if distribution gates or weirs are provided in the walls 70, 72 and 74, or divider wall 52, such gates or weirs must be closed in conjunction with throttling of valves 64 and the correct adjustment of the valves 62 and 64 may be determined by visually observing the tower to make certain that no ice is forming on any of the components thereof.

Under extremely cold conditions it may be desirable to further adjust the valves 62 and 64, even to the extent of causing more hot water to flow into the outer basin section, than can drain off through the orifices 50, and thereby resulting in overflow of the hot water across the upper margin of wall 40 as shown in FIG. 5, onto the uppermost inlet louver 32. In this manner, added quantities of the hot water are caused to cascade down the inlet louvers, thereby completely melting any ice tending to form on the inlet louvers. Furthermore, because of the high velocity air stream inducted into the air inlet of the tower, the additional hot water directed onto the inlet louvers 32 will tend to be drawn into the tower and against the fill assembly, thereby melting ice forming on the structural members of framework 26, and the outermost slats of fill assembly sections 28a.

It is to be expected that under typical winter weather operation, the procedure prescribed above will suffice to preclude information of significant quantities of ice on the structural components of the tower. However, under operation in violent wind conditions, eddies may be caused at the air inlet and disruption of the natural forces of the hot water, air pressures and velocities, thereby overriding the normal air induction mechanism of the tower. When such conditions are superimposed on prolonged, subfreezing conditions, large mass elements of the tower structure or louver members may instantly freeze impinging wayward drops or spray. Under these extreme conditions, the tower may be operated for a period under a secondary plan, wherein the valves 65 controlling flow of water into conduit 54 via T's 58 are adjusted to direct larger quantities of water into the segments between walls 70, 72 and 74, or to actually discontinue flow of water into certain segments for limited periods of time. Thus, not only may the flow of water into the outer ring section be varied with respect to the flow of water into the inner section, but the amount of water introduced into the radially divided segments may also be adjusted as required to preclude formation of ice on the components of the tower. As one supply line 60 is throttled, the two-thirds of the tower served by the other pipes 60 take on additional flow, the hot water side wall 40 is overflowed, and additional quantities of water will cascade down the inlet louver 32. The sections of the tower wherein the water distribution is throttled back or shut down admit a greater quantity of chilled, unwarmed air than the other section of sections, and this phenomenon which is commonly termed "cold air slip" tends to kill or decrease the buoyancy in the rest of the shell 18 and immediately reduce the chimney effect or air induction around the entire perimeter of the tower. This, in turn, further cuts back on the drawback of water from the inlet, and hot water flooding of the inlet louvers, associated with the section which is receiving hot water, is increased.

Thus, the problem of icing of components of the tower under cold weather operation may be met with the present hot water distribution apparatus without the utilization of reversible fans as heretofore has been necessary in towers operated under cold climatic conditions.

Optimum performance is obtained from tower 10 when a maximum area of the fill assembly is maintained in a working, or water breakup condition. Thus, since the slope of the inlet face of fill assembly 28 is correlated with the air flow at the maximum ambient air temperature expected to be encountered, increase of air velocity caused by a decrease in ambient temperature, results in increased drawback of water from the inlet face of the fill assembly although the lower temperature air stream flowing at a higher velocity has a somewhat greater cooling capacity, water of substantially less surface area is subjected to such area and the efficincy of tower 10 tends to decrease.

The structure of the present invention is also useful to alleviate the tendency of the water gravitating through fill assembly 28 to drift away from the inlet face thereof as the air velocity through the fill increases. Thus, the operator of the tower is in a position to take steps as required to maintain performance thereof as nearly optimum as practical under varying climatic conditions. During fall and spring for example, when relatively low ambient temperatures are experienced, even though such temperatures are not sufficiently low to cause serious icing problems as such, the tower operator may operate valves 62 and 64 to cause a sufficiently greater volume of water to be deliverd to the outer ring section of the distribution deck to assure full wetting of the fill assembly 28 even though the air velocity therethrough is substantially higher than the air velocity at maximum design wet bulb temperature. Furthermore, by utilizing motorized valves coupled to a temperature sensitive valve control unit, the water delivery to the outer and inner ring sections of the water distribution deck may be varied with temperature change.

In the modified version of the present invention illustrated in FIG. 7, and wherein previously identified parts are denominated with like numerals, distribution deck 26 is divided into inner and outer annular basin sections, with four radial walls being provided, of which walls 100 and 102 are illustrated between walls 40 and 43 to divide the basins into a series of inner and outer quadrants. Each of the inner and outer quadrants is then provided with a longitudinally arcuate conduit supported above deck 36 with those designated in FIG. 7 by the numerals 108a to 108f respectively, being shown. Each pair of aligned conduits 108 between adjacent walls such as 100 and 102 are joined by a subheader 100 located intermediate the ends thereof. A supply riser 112 is in turn coupled to the outer end of each of the headers 110.

Control valves 114 and 116 are provided in each of the inner conduits 108 on opposite sides of respective headers 110, while similar control valves 118 and 120 are positioned in respective outer conduits 108 on opposed sides of the headers. Adjacent valves 114 and 116, as well as proximal valves 118 and 120, are preferably interlocked in reciprocating function for simultaneous operation and are all motorized for remote control.

Normally operable control valves 122, similar to valves 62 and 64, are also provided in spaced relationship along the length of each of the conduits 100.

The control units coupled to valves 114 to 120 may be either temperature sensitive or sequentially controlled by a programmed or computer-operated master control to effect shift of more or less water from inboard to outboard and sequentially close off quadrant by quadrant to provide optimum flooding of individual or the remaining fill assemblies and associated inlet louvers. The infinite flexibility of the structure illustrated in FIG. 7 permits maintenance of water drawback on respective fill assemblies in desirable correlation with the slope of the outer faces thereof under any environmental condition encountered and affords maximum assurance of ice-free operation.

Having thus described the invention, what is claimed as new and desired to be secured by Letters Patent is:

1. In a crossflow water cooling tower provided with an air inlet and an air outlet, and a fill assembly having an outer, generally upright face adjacent the air inlet, and located within the path of air flowing from the air inlet to the air outlet, the combination with said fill assembly of:
   hot water distribution means overlying the fill assembly for receiving and distributing hot water over a substantial area of the adjacent portion of the fill assembly;
   structure on said distribution means dividing the latter into first and second sections with the first section located in closer relationship to said outer face of the fill assembly than the second section;
   means for delivering hot water to said first and second sections respectively for distribution onto the fill assembly and including control components operable to selectively vary the rate of delivery of hot water to corresponding first and second sections whereby the quantity of water delivered to the first section with respect to the amount delivered to the second section may be increased as required to provide optimum water loading of the fill assembly under varying environmental conditions and to preclude icing of the outer face of the fill assembly under ambient operating temperatures below the freezing point of the water,
   said distribution means including a horizontal deck provided with a series of water distribution openings therein and upright walls projecting upwardly from the deck adjacent the outer and inner margins of the fill assembly, said walls and the deck cooperating to present a water-receiving basin,
   said structure comprising a third upright wall on the deck between the first-mentioned walls to thereby divide the basin into said first and second sections; and
   a series of horizontal inlet louvers located adjacent said outer face of the fill assembly and positioned in vertically staggered relationship with the lowermost margin of each louver located above an area of the louver there next below intermediate the longitudinal margins thereof, said series of louvers being inclined in the direction of air flow and the uppermost louver of the series thereof being located below the outer wall of the distribution means whereby upon selective control of the components to cause an excess of hot water to be directed into said first section, the hot water overflows said outer wall and then cascades down the series of inlet louvers.

2. In a natural draft crossflow water cooling tower having an upright stack open at the top thereof to define an air outlet and provided with air inlet means at the lower extremity thereof around the perimeter of the stack, and crossflow type fill asembly means positioned within said air inlet means at the lowermost extremity of the stack, the combination with said fill assembly means of:
   hot water distribution means overlying the fill assembly means around the perimeter of the stack for receiving and distributing hot water over a substantial area of the adjacent portions of the fill assembly means;
   structure on said distribution means dividing the latter into first and second sections circumscribing the stack with the first section being located outwardly of the second section;
   means for delivering hot water to said first and second sections for distribution onto the fill assembly means and including control components for selectively varying the rate of delivery of hot water to corresponding first and second sections whereby the quantity of water delivered to the first section with respect to the amount delivered to the second section may be increased as required to provide optimum water loading of the fill assembly under varying environmental conditions and to preclude icing of the outer faces of the fill assembly means under ambient operating temperatures below the freezing point of the water,
   said distribution means including a generally horizontal deck of annular configuration, a first, upright, circular wall on the deck adjacent the outer peripheral margin thereof, a second, upright, circular wall on the deck proximal to the inner margin of the same, and a third, upright, circular wall on the deck intermediate the first and second walls and cooperating with the latter to present said first and second sections of the distribution means; and
   spaced divider means extending radially of the deck between said first and second walls and dividing said first and second sections into a plurality of individual segments, said delivery means including conduits disposed to direct hot water into all of said segments and the control components being operable to selectively vary delivery of hot water to respective segments of the first and second sections.

3. The invention as claimed in claim 2, wherein said delivery means includes an arcuate conduit for each pair of adjacent segments and overlying the third wall in alignment therewith, said conduits extending partially around the stack, and wherein said control components include valve controlled elements communicating with each of the conduits and disposed to direct water from respective conduits into corresponding segments of said first and second sections.

4. The invention as claimed in claim 3, wherein is provided a selectively controllable water supply line coupled to each of said water delivery conduits, and thereby providing at least one supply line between each adjacent pair of said divider means.

5. The invention as claimed in claim 2, wherein is provided an arcuate conduit overlying each of said segments and provided with valve means therein controlling supply of hot water thereto, there being header means intercommunicating each pair of aligned conduits and adapted to be coupled to a respective hot water supply line.

References Cited

UNITED STATES PATENTS 2,732,190   1/1956   Mart.
3,117,170   1/1964   Mart et al.

FOREIGN PATENTS 806,884   1/1959   Great Britain.

HARRY B. THORNTON, *Primary Examiner.*

RONALD R. WEAVER, *Examiner.*